(12) United States Patent
Sharma

(10) Patent No.: US 10,545,027 B2
(45) Date of Patent: Jan. 28, 2020

(54) METHOD AND SYSTEM FOR PREVENTING TRAFFIC CONGESTION OF VEHICLES

(71) Applicant: WIPRO LIMITED, Bangalore (IN)

(72) Inventor: Mayank Sharma, Bangalore (IN)

(73) Assignee: Wipro Limited, Bangalore (IN)

( * ) Notice: Subject to any disclaimer, the term of this patent is extended or adjusted under 35 U.S.C. 154(b) by 75 days.

(21) Appl. No.: 15/817,797

(22) Filed: Nov. 20, 2017

(65) Prior Publication Data

US 2019/0086224 A1 Mar. 21, 2019

(30) Foreign Application Priority Data

Sep. 21, 2017 (IN) .............................. 201741033473

(51) Int. Cl.
| | | |
|---|---|---|
| G06F 7/00 | (2006.01) | |
| G06F 17/00 | (2019.01) | |
| G01C 21/34 | (2006.01) | |
| G08G 1/01 | (2006.01) | |
| G06F 19/00 | (2018.01) | |
| G06G 7/70 | (2006.01) | |
| G06G 7/76 | (2006.01) | |
| G08G 1/00 | (2006.01) | |

(52) U.S. Cl.
CPC ....... *G01C 21/3492* (2013.01); *G08G 1/0125* (2013.01)

(58) Field of Classification Search
CPC ............ G01C 21/3492; G01C 21/3415; G01C 21/20; G08G 1/0125; G08G 1/096811; G08G 1/0133; G08G 1/01
USPC .................................................. 701/412, 118
See application file for complete search history.

(56) References Cited

U.S. PATENT DOCUMENTS

| | | |
|---|---|---|
| 8,781,716 B1 | 7/2014 | Wenneman et al. |
| 9,368,029 B2 | 6/2016 | Gueziec |
| 2016/0012720 A1* | 1/2016 | Boss ................ G08G 1/096822 |
| | | 701/118 |

FOREIGN PATENT DOCUMENTS

| | | |
|---|---|---|
| CN | 204291053 | 4/2015 |
| GB | 2352292 A | 1/2001 |
| WO | 2010107394 A1 | 9/2010 |

(Continued)

OTHER PUBLICATIONS

English Translation for WO2016113893A1.*

(Continued)

*Primary Examiner* — Mahmoud S Ismail
(74) *Attorney, Agent, or Firm* — Finnegan, Henderson, Farabow, Garrett & Dunner, LLP

(57) ABSTRACT

Disclosed herein is method and system for preventing traffic congestion of vehicles. Real-time traffic data related to a primary route being traversed by a vehicle, and location information of the vehicle are collected and analyzed to determine one or more alternative routes having less traffic congestion than the primary route. Further, congestion weightages are assigned to each of the alternative routes to identify an optimal route, having least traffic congestion, among the alternative routes. The optimal route is recommended to a user of the vehicle, thereby preventing traffic congestion. In an embodiment, the present method obtains the real-time traffic data directly from a computing device and/or one or more sensors integrated in the vehicle, and thereby accurately identifies the optimal route for the vehicle.

17 Claims, 9 Drawing Sheets

(56) References Cited

FOREIGN PATENT DOCUMENTS

| WO | WO 2016/086139 | 6/2016 | |
|---|---|---|---|
| WO | 2016113893 A1 | 7/2016 | |
| WO | WO-2016113893 A1 * | 7/2016 | ............. G01C 21/28 |

OTHER PUBLICATIONS

Extended European Search Report issued in the European Patent Office in counterpart European Application No. 17209188.6, dated Jun. 7, 2018, 9 pages.

K. Green, "Tracking Traffic with Cell Phones: A new project collects traffic data from GPS-enabled cell phones", *MIT Technology Review*, (2008), pp. 1-6.

R. Dhakad, et al., "GPS based road traffic congestion reporting system", *IEEE*, (2014), pp. 1-2.

* cited by examiner

METHOD AND SYSTEM FOR PREVENTING TRAFFIC CONGESTION OF VEHICLES

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Field of the Invention

The present subject matter is related, in general to real-time monitoring of vehicle traffic and more particularly, but not exclusively to a method and system for preventing traffic congestion of vehicles.

Description of Related Art Including Information Disclosed Under 37 CFR 1.97 and 1.98

Presently, traffic congestion has become a major problem for daily commuters in most of the metropolitan cities across the globe. Traffic congestion may be a result of regular movement of traffic or a sudden outbreak of traffic. The regular traffic congestion may occur due to daily commuting population, who travel at a specific time of day. Whereas, the sudden outbreak of traffic may occur due to random incidents such as road accidents, vehicle breakdown, construction work, floods, and the like. Efficient management of traffic is necessary to ensure safety of the commuters, while reducing total travel time taken by the commuters.

Some of the existing traffic management methods include use of roadside sensors such as, motion-sensing camera, vehicle detection sensors, and the like, to collect traffic information and to detect and manage the traffic congestion. Traffic management systems that use roadside sensors require high quality traffic information, in real-time, for accurately predicting and managing the traffic congestion. Further, the roadside sensors may not be widely applicable, since they cover only a limited coverage area and require expensive resources along with regular maintenance.

Other existing traffic management methods include generating traffic reports based on crowd-sourced traffic data inputs provided by the commuters. The crowd-sourced traffic data may not be reliable for the fact that, the crowd-sourced may be contributed by all occupants of a single vehicle. For example, if there are 60 passengers in a bus, each of the 60 passengers may act as different contributing agents for the traffic data for a single vehicle, thereby leading to erroneous traffic information. This may lead to generation of false reports that are not reliable for accurate management of the traffic. Additionally, the inaccurate traffic reports may intensify existing traffic congestion in an area. Also, the existing traffic management methods may not be effective in differentiating the vehicles that are moving and the vehicles that are stagnant on the road, leading to greater amount of congestion.

BRIEF SUMMARY OF THE INVENTION

Disclosed herein is a method of preventing traffic congestion of vehicles. The method comprises identifying, by a traffic management system, a primary route for a target vehicle based on source and destination information received from at least one of a Global Positioning System (GPS) associated with the target vehicle and a computing device associated with the target vehicle or by analyzing historical data associated with the target vehicle. Further, the method comprises receiving real-time traffic data on the primary route from at least one of a computing unit and one or more sensors in each of one or more vehicles on the primary route. Upon identifying the real-time traffic data, the method comprises identifying one or more alternative routes to the primary route based on the real-time traffic data and location information of the target vehicle received from at least one of the GPS and the computing device. Further, the method comprises assigning a traffic congestion weightage to each of the one or more alternative routes based on one or more congestion parameters and historical data associated with the target vehicle. Finally, the method comprises recommending, by the traffic management system, an optimal route to a user associated with the target vehicle for preventing the traffic congestion. The optimal route is determined from the one or more alternative routes based on the traffic congestion weightage assigned to each of the one or more alternative routes.

Further, the present disclosure relates to a traffic management system for preventing traffic congestion of vehicles. The traffic management system comprises a processor and a memory. The memory is communicatively coupled to the processor and stores processor-executable instructions, which on execution, cause the processor to identify a primary route for a target vehicle based on source and destination information received from at least one of a Global Positioning System (GPS) associated with the target vehicle and a computing device associated with the target vehicle or by analyzing historical data associated with the target vehicle. Further, the instructions cause the processor to receive real-time traffic data of the primary route from at least one of a computing unit and one or more sensors in each of one or more vehicles on the primary route. Upon receiving the real-time traffic data, the instructions cause the processor to identify one or more alternative routes to the primary route based on the real-time traffic data and location information of the target vehicle received from at least one of the GPS and the computing device. Further, the instructions cause the processor to assign a traffic congestion weightage to each of the one or more alternative routes based on one or more congestion parameters and historical data associated with the target vehicle. Finally, the instructions cause the processor to recommend an optimal route to a user associated with the target vehicle to prevent the traffic congestion. The optimal route is determined from the one or more alternative routes based on the traffic congestion weightage assigned to each of the one or more alternative routes.

Furthermore, the present disclosure relates to a non-transitory computer readable medium including instructions stored thereon that when processed by at least one processor cause a traffic management system to perform operations comprising identifying a primary route for a target vehicle based on source and destination information received from at least one of a Global Positioning System (GPS), associated with the target vehicle, and a computing device associated with the target vehicle, or by analyzing historical data associated with the target vehicle. Upon identifying the primary route, the instructions cause the traffic management system to receive real-time traffic data on the primary route from at least one of a computing unit and one or more sensors in each of one or more vehicles on the primary route. Further, the instructions cause the traffic management system to identify one or more alternative routes to the primary route based on the real-time traffic data and location information of the target vehicle received from at least one of the GPS and the computing device. Upon identifying the one or more alternative routes, the instructions cause the traffic management system to assign a traffic congestion weightage to each of the one or more alternative routes based on one or more congestion parameters and historical data associated with the target vehicle. Finally, the instructions cause the traffic management system to recommend an optimal route to a user associated with the target vehicle for preventing the traffic congestion. The optimal route is determined from the one or more alternative routes, based on the traffic congestion weightage assigned to each of the one or more alternative routes.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE SEVERAL VIEWS OF THE DRAWING(S)

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 1A:
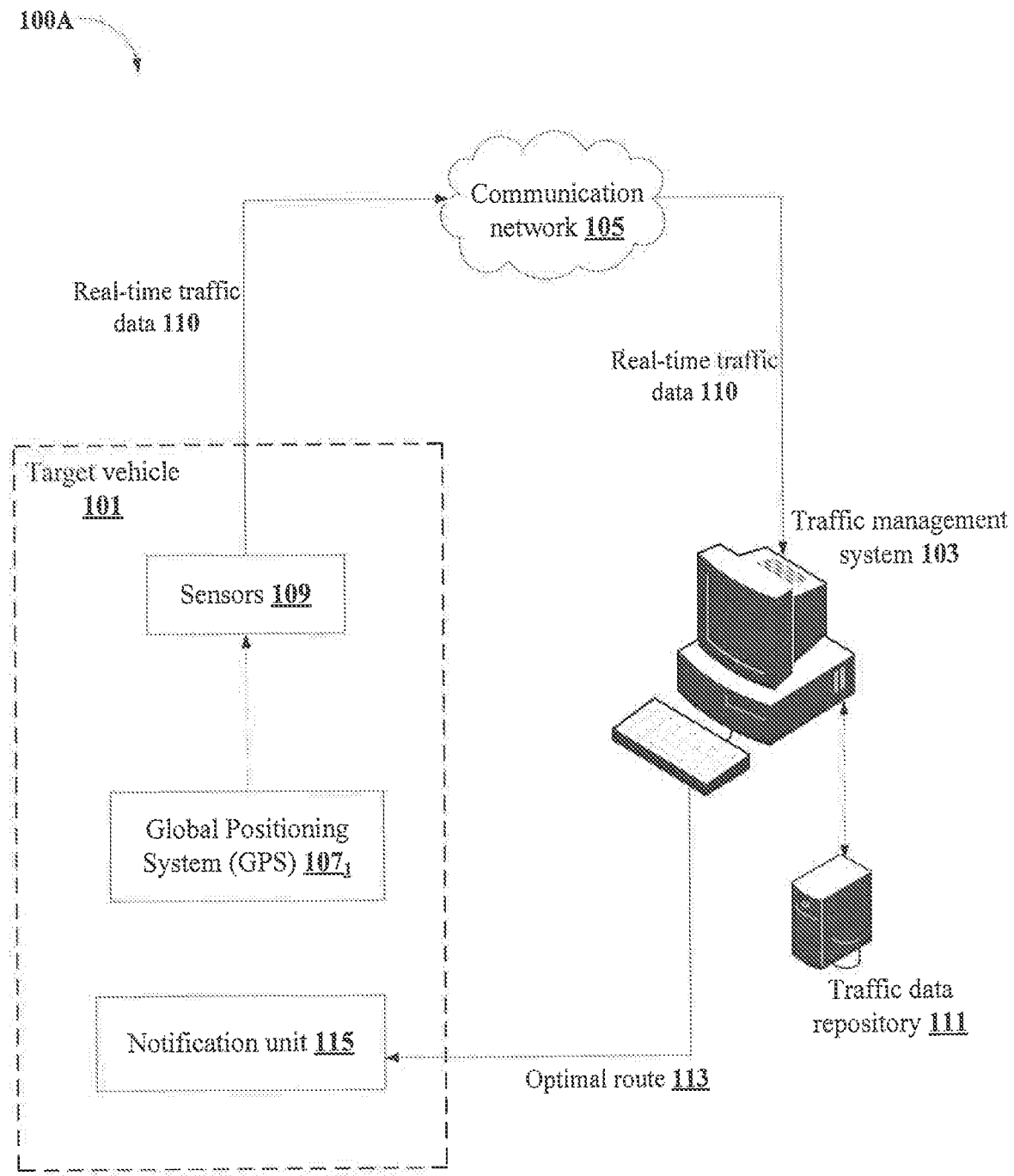
FIGS. 1A-1C illustrate exemplary environments for preventing traffic congestion of vehicles in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION OF THE INVENTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a traffic management system for preventing traffic congestion of vehicles. The method relates to performing decongestion of traffic using Internet of Things (IoT) and data science techniques. The traffic decongestion is achieved based on vehicle specific traffic data, rather than the traffic data obtained from various sources, such as crowd-sources, road-side sensors and the like. The vehicle specific real-time traffic data is analyzed to inform a driver of the vehicle about real-time traffic congestion. Further, the method includes providing alternative routes, and futuristic traffic congestion reports, predicted based on analysis of the vehicle specific real-time traffic data. Thus, implementing the IoT and the data science techniques for traffic decongestion would help in reducing the traffic congestion in an effective manner.

In an embodiment, the IoT based sensors configured in the vehicle may help in transferring traffic information related to the vehicle to a centralized data center. The data science techniques may help in analyzing the traffic information and identifying a primary route between vehicle source and destination locations. Further, the routes which have been previously traveled by the vehicle are maintained as historical data of the vehicle for discovering a commuting pattern of the vehicle. Analyzing the commuting pattern of the vehicle may help in predicting the traffic, as well as suggesting alternative non-congested routes to the drivers.

In an embodiment, each vehicle may be integrated with a Global Positioning System (GPS) based IOT sensors to identify longitudinal and latitudinal location coordinates of the vehicle. Further, the GPS sensor may be embedded or associated with a display interface attached with the vehicle to display direction and routes to the driver. The IoT based sensors may help in connecting the vehicles to a central traffic data center via a network. The central traffic data center may apply the data science techniques on the real-time traffic data to analyze traffic data, compute traffic congestion, and predict future traffic based on the real-time traffic data.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1B:
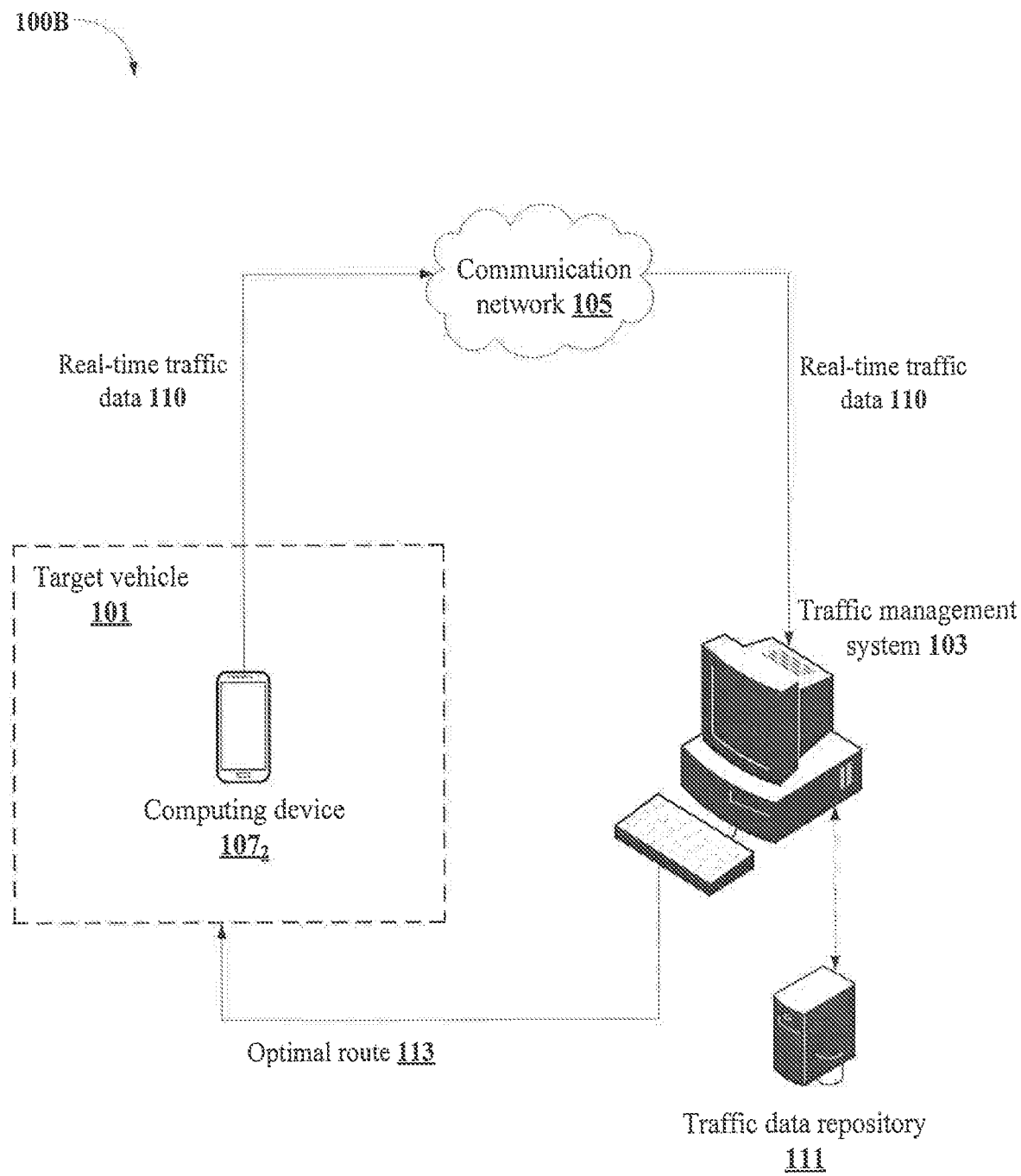

FIGS. 1A and 1B illustrate exemplary environments for preventing traffic congestion of vehicles in accordance with some embodiments of the present disclosure.

As illustrated in FIG. 1A, the environment 100A includes a target vehicle 101, a traffic management system 103 and a communication network 105 that establishes communication between the target vehicle 101 and the traffic management system 103. As an example, the communication network 105 may be a wireless communication network 105 such as, wireless Metropolitan Area Network (MAN), or wireless Wide Area Network (WAN) that enable seamless data transmission between the target vehicle 101 and the traffic management system 103.

In an implementation, the target vehicle 101 may be integrated with a Global Positioning System (GPS) $107_1$, the one or more sensors 109, and a notification unit 115. In an embodiment, the GPS $107_1$ integrated in the target vehicle 101 may be a general-purpose navigation tool, which is used to determine location of the target vehicle 101 in real-time. Further, the one or more sensors 109 integrated in the target vehicle 101 may be Internet of Things (IoT) based sensors 109 that are capable of collecting and transmitting information related to the target vehicle 101 to the traffic management system 103. As an example, the one or more sensors 109 may include, without limiting to, sensors that are capable of collecting location information such as longitude and latitude coordinates of the target vehicle 101 for identifying a current location of the target vehicle 101. In an embodiment, the one or more sensors 109 may be interfaced with the GPS $107_1$ to collect location information of the target vehicle 101, and to transmit the location information of the target vehicle 101 to the traffic management system 103 through the communication network 105.

In an embodiment, the information related to the target vehicle 101 and the location information of the target vehicle 101 may be combined and transmitted as real-time traffic data 110 to the traffic management system 103 at predetermine intervals. For example, the real-time traffic data 110 may be transmitted to the traffic management system 103 at every 5 seconds, thereby continuously transmitting status of the target vehicle 101 to the traffic management system 103.

In an embodiment, upon receiving the real-time traffic data 110 from the one or more sensors 109, the traffic management system 103 may identify a primary route for the target vehicle 101 based on source and destination information of the target vehicle 101 comprised in the location information of the target vehicle 101. As an example, the source location of the target vehicle 101 may be a current location of the target vehicle 101. Similarly, the target location of the target vehicle 101 may be a destination location that the user wants to reach. The destination location may be received from the user or automatically retrieved from historical data associated with the target vehicle 101 or from historical travel pattern of the user. Suppose, if the historical travel pattern of the user indicates that, every day the user travels between his house and his workplace location, then the destination location of the user may be determined as the workplace location, when the user is starting journey from his house.

In an embodiment, for estimating the traffic congestion on the primary route, the traffic management system 103 may receive real-time traffic data 110 from each of one or more vehicles moving and/or being stagnant on the primary route of the target vehicle 101. As an example, the real-time traffic data 110 collected from each of the one or more vehicles on the primary route may be used to determine total number of moving vehicles on the primary route, total number of stagnant vehicles on the primary route.

In an embodiment, the traffic management system 103 may identify one or more alternative routes to the primary route upon detecting traffic congestion on the primary route. The traffic congestion on the primary route may be detected based on the real-time traffic data 110 of the primary route. Each of the one or more alternative routes, as the name suggests, are different routes that connect between the source and destination locations of the target vehicle 101. Each of the one or more alternative routes may differ from each other in terms of total distance and/or total time required to reach the destination. In an embodiment, if the target vehicle 101 has already covered a certain distance before detecting congestion on the primary route, then the one or more alternative routes may be identified between a current location of the target vehicle 101 and the destination location of the target vehicle 101. Further, each of the one or more alternative routes may include one or more intermediate nodes, such as traffic signal points, and connection junctions, which are continuously monitored by the traffic management system 103 for determining an optimal route 113 among the one or more alternative routes.

In an embodiment, the optimal route 113 may be one of the one or more alternative routes that has least congestion of traffic. The optimal route 113 may be determined by assigning a traffic congestion weightage to each of the one or more alternative routes based on one or more congestion parameters and historical data associated with the target vehicle 101. As an example, the one or more congestion parameters used for computing the congestion weightage may include, without limiting to, the total distance corresponding to each of the one or more alternative routes, number of moving vehicles on each of the one or more alternative routes, a predetermined placement factor to be assigned to each of the moving vehicles on each of the one or more alternative routes, and number of stagnant vehicles on each of the one or more alternative routes.

The historical data may include historical travel pattern of the target vehicle 101, which is stored on a traffic data repository 111 associated with the traffic management system 103. The traffic data repository 111 may be an external data server that stores historical, vehicle-specific information required for determining the one or more alternative routes to the target vehicle 101. The traffic data repository 111 may be dynamically updated to store information related to recent routes traversed by the target vehicle 101, time taken by the target vehicle 101 to the reach the destination location, and the like.

In an embodiment, the traffic congestion weightage assigned to a route may be directly proportional to the number stagnant vehicles on that route. Alternatively, the traffic congestion weightage may be inversely proportional to the number of moving vehicles on the route. In other words, the traffic congestion weightage assigned to a route reflects amount of traffic congestion on that route. Thus, one of the one or more alternative routes having least congestion weightage may have least traffic congestion, and thereby, may be determined as the optimal route 113 for the target vehicle 101.

In an embodiment, upon determining the optimal route 113 among the one or more alternative routes, the traffic management system 103 may recommend the optimal route 113 to the user associated with the target vehicle 101, thereby diverting the target vehicle 101 to the less congested optimal route 113. By recommending users to traverse through the optimal route 113, the traffic management system 103 ensures that the routes, which are already congested, are not further congested by the one or more vehicles moving on the same route. In an implementation, the optimal route 113 may be recommended to the users through a notification unit 115 configured in the target vehicle 101. As an example, the notification unit 115 configured in the target vehicle 101 may be a display interface integrated with the GPS $107_1$ unit in the target vehicle 101. Alternatively, the optimal route 113 may be recommended through a computing device (shown in FIG. 1B) associated with the target vehicle 101. In some implementations, the optimal route 113 may be directed to the user as voice based instructions.

FIG. 1B illustrates an alternative environment 100B for preventing traffic congestion of vehicles, when the target vehicle 101 is not integrated with the GPS $107_1$ and/or the one or more sensors 109. In such instances, a computing device $107_2$, such as a smartphone, may be associated with the target vehicle 101 for receiving the real-time traffic data 110 from the target vehicle 101. In some implementations, the computing device $107_2$ may be configured with a navigation application or a location tracking application, such that, the computing device $107_2$ is capable of tracking and transmitting the location information of the target vehicle 101 to the traffic management system 103 in real-time. In an embodiment, the computing device $107_2$ may be assigned with a unique identification number, which is specific to the target vehicle 101, for registering the computing device $107_2$ with the traffic management system 103. Further, the traffic management system 103 may be configured to receive the real-time traffic data 110 from only that computing device $107_2$, whose unique identification number matches with the unique identification number already registered with the traffic management system 103. Thus, a dedicated communication link may be established between the traffic management system 103 and corresponding computing device $107_2$, associated with the target vehicle 101, for collecting the real-time traffic data 110 related to the target vehicle 101.

Figure 1C:
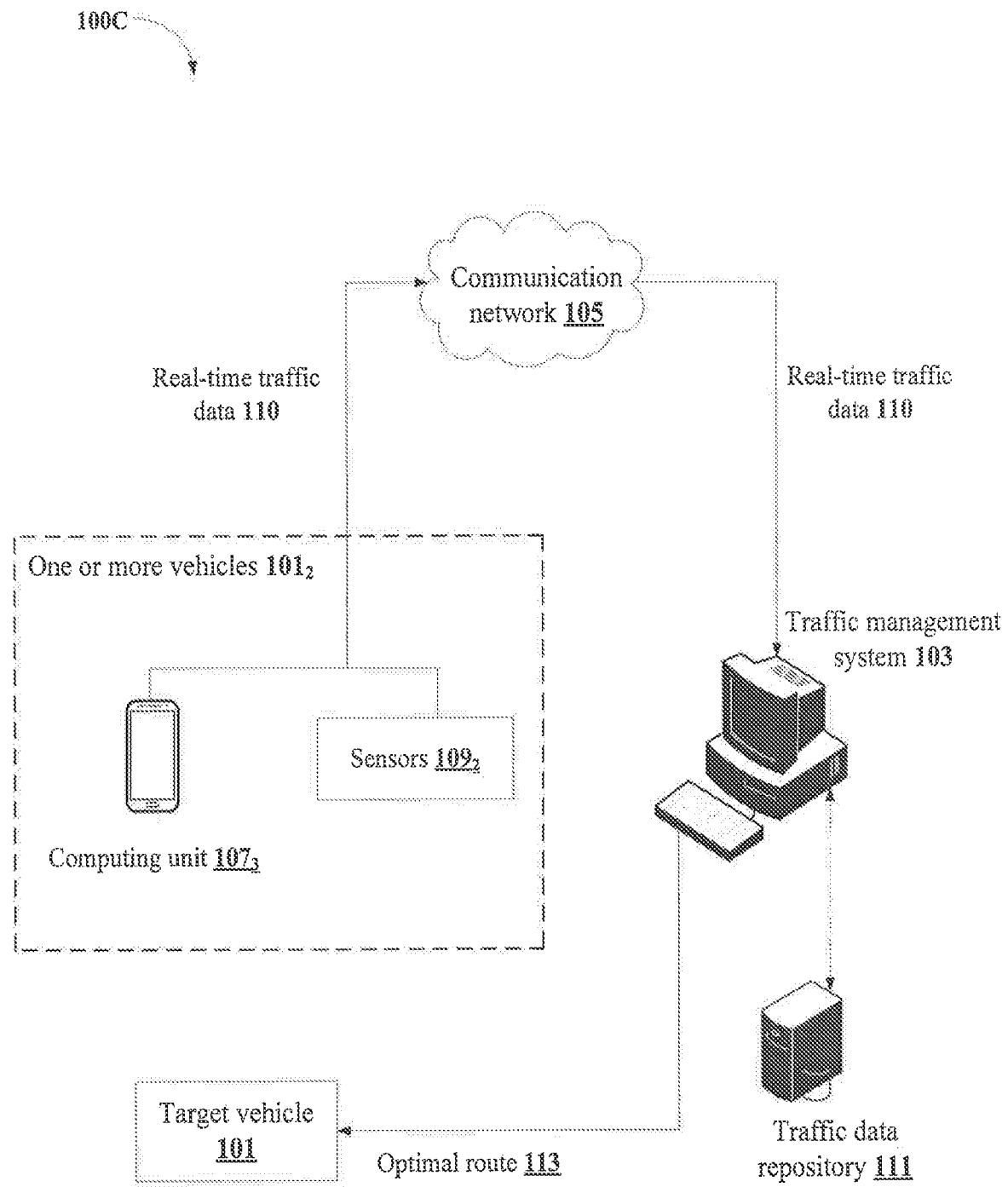

FIG. 1C illustrates an exemplary environment 100C for receiving real-time traffic data 110 from each of one or more vehicles $101_2$ on the primary route for determining traffic congestion on the primary route.

In an embodiment, the one or more vehicles $101_2$ may include the target vehicle 101 and one or more other vehicles present on the primary route and/or on a route being traversed by the target vehicle. Each of the one or more vehicles $101_2$ may be configured with a computing unit $107_3$, and one or more sensors $109_2$ for collecting the real-time traffic data 110 related to the primary route. Further, the real-time traffic data 110 received from each of the one or more vehicles $101_2$ may be processed and analysed by the traffic management system 103 to determine an optimal route for the target vehicle 101.

As illustrated in the above exemplary environments, the present disclosure ensures that, the real-time traffic data 110 related to traffic congestion across a route is received only from the vehicles traversing through that route. In other words, the present method estimates the traffic congestion using vehicle-specific traffic information obtained directly from the computing device $107_3$ and/or one or more sensors $109_2$ associated with the one or more vehicles $101_2$. Therefore, the present method eliminates need for collecting traffic information from various unreliable sources such as, roadside sensors, mobile devices associated with the travellers and other crowd-sourced information, which contain irregularities in the form of redundant or inaccurate traffic data. Hence, the method of estimating the traffic congestion and thereby determining the optimal route 113, as disclosed in the present disclosure, is more accurate and helps in preventing the traffic congestion.

Figure 2:
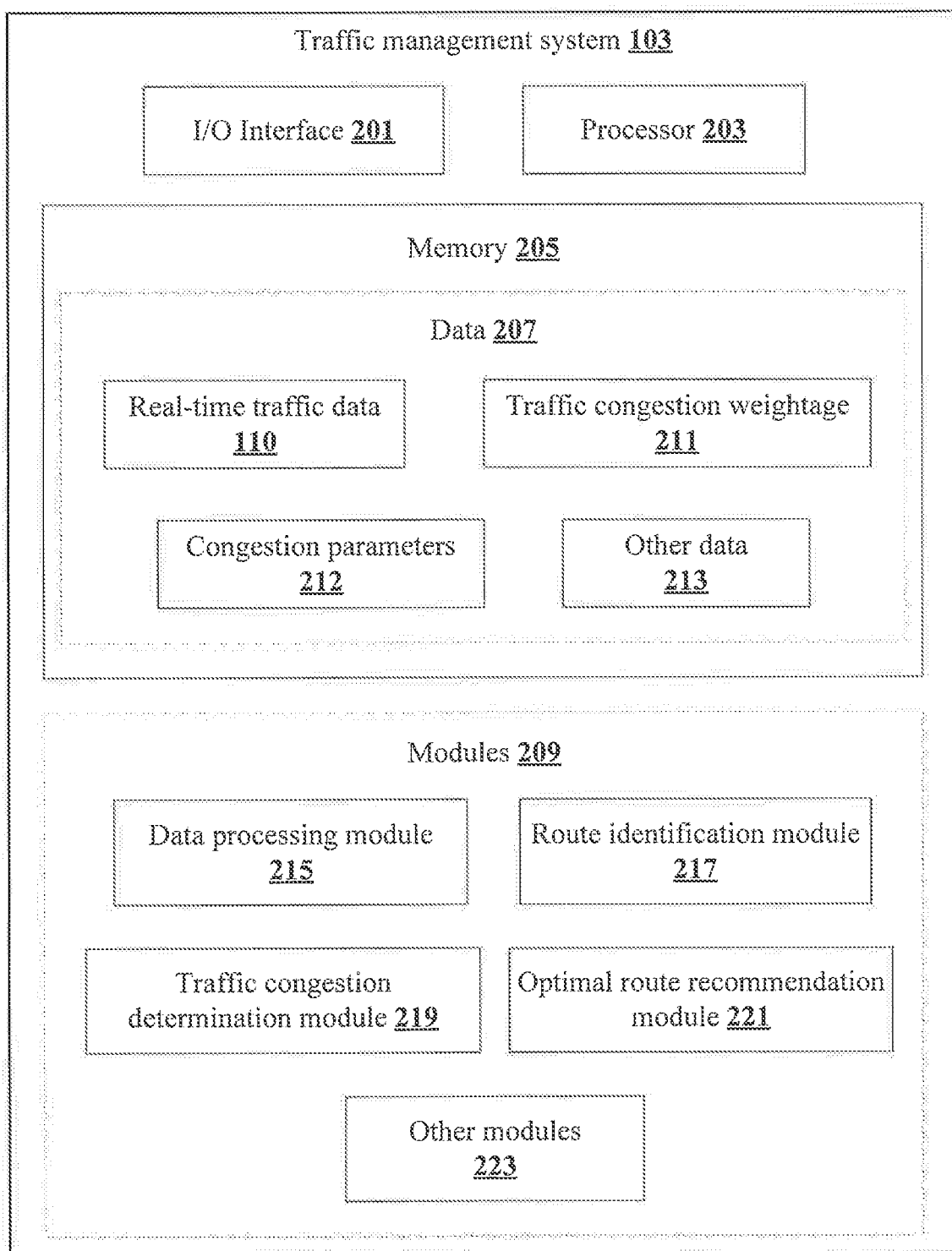
FIG. 2 shows a detailed block diagram illustrating a traffic management system for preventing traffic congestion of vehicles in accordance with some embodiments of the present disclosure.

FIG. 2 shows a detailed block diagram illustrating a traffic management system 103 for preventing traffic congestion of vehicles in accordance with some embodiments of the present disclosure.

The traffic management system 103 includes an I/O interface 201, a processor 203, and a memory 205. The I/O interface 201 may be configured to receive real-time traffic data 110 from a target vehicle 101. The memory 205 may be communicatively coupled to the processor 203. The processor 203 may be configured to perform one or more functions of the traffic management system 103 for preventing traffic congestion of vehicles.

In some implementations, the traffic management system 103 may include data 207 and modules 209 for performing various operations in accordance with the embodiments of the present disclosure. In an embodiment, the data 207 may be stored within the memory 205 and may include, without limiting to, the real-time traffic data 110, traffic congestion weightage 211, congestion parameters 212 and other data 213.

In some embodiments, the data 207 may be stored within the memory 205 in the form of various data structures. Additionally, the data 207 may be organized using data models, such as relational or hierarchical data models. The other data 213 may store data, including temporary data and temporary files, generated by the modules 209 for performing the various functions of the traffic management system 103.

In an embodiment, the real-time traffic data 110 may include location information of the target vehicle 101 obtained from the GPS $107_1$ and/or the computing device $107_2$ and other vehicle information received from the one or more sensors 109. The real-time traffic data 110 related to a primary route of the target vehicle 101 may be used to determine traffic congestion on the primary route. In an implementation, the real-time traffic data 110 may be retrieved at predetermined regular intervals, say once in every 5 seconds, so that, real-time status of traffic on the primary route is continuously monitored for determining the traffic congestion. In an embodiment, the real-time traffic data 110 related to each of one or more other vehicles (along with the target vehicle 101) on the primary route may be collected and analyzed for identifying one or more alternative routes to the primary route.

In an embodiment, the traffic congestion weightage 211 may be a numeric factor assigned to each of the one or more alternative routes, based on one or more congestion parameters 212. As an example, the one or more congestion parameters 212 may include, without limiting to, total distance corresponding to each of the one or more alternative routes, number of moving vehicles on each of the one or more alternative routes, a predetermined placement factor to be assigned to each of the moving vehicles on each of the one or more alternative routes, and number of stagnant vehicles on each of the one or more alternative routes. Values of each of the one or more congestion parameters 212 may be different for each of the one or more alternative routes depending on intensity of traffic congestion across each of the one or more alternative routes.

In an embodiment, value of the traffic congestion weightage 211 of each of the one or more alternative routes may be computed using Equation (1) below:

Traffic congestion weightage=(Total distance of the alternative route+total of predetermined placement factor assigned for the alternative route*Number of stagnated vehicles on the alternative route)    (1)

Wherein,

The total distance of the alternative route may be determined as a sum of distance between each of one or more successive intermediate nodes in the alternative route;

Placement factor is a predetermined constant value used to determine impact of each stagnant vehicle on the traffic congestion across the alternative route;

Number of stagnated vehicles represents total number of vehicles that are on the alternative route, but are not moving.

Suppose, there are 4 stagnant vehicles and 1 moving vehicle on a route 'R' of 10 KM distance. Let the predetermined placement factor for the moving vehicle be 10. Then, the traffic congestion weightage 211 for route 'R' may be calculated using the equation (1) as following:

$$\begin{aligned} \text{Traffic congestion weightage for route } R &= (\text{Total distance of 'R'} + \\ &\quad \text{Total placement factor} * \\ &\quad \text{No. of stagnant vehicles}) \\ &= (10 + 10 * 4) \\ &= 50 \text{ units.} \end{aligned}$$

In some embodiments, the data 207 may be processed by one or more modules 209 of the traffic management system 103. In one implementation, the one or more modules 209 may be stored as a part of the processor 203. In another implementation, the one or more modules 209 may be communicatively coupled to the processor 203 for performing one or more functions of the traffic management system 103. The modules 209 may include, without limiting to, a data processing module 215, a route identification module 217, a traffic congestion determination module 219, an optimal route recommendation module 221 and other modules 223.

As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality In an embodiment, the other modules 223 may be used to perform various miscellaneous functionalities of the traffic management system 103. It will be appreciated that such modules 209 may be represented as a single module or a combination of different modules.

In an embodiment, the data processing module 215 may be responsible for processing the real-time traffic data 110 received from the one or more sensors 109 in the target vehicle 101. The data processing module 215 may analyze and normalize the real-time traffic data 110 to validate the quality and consistency in the real-time traffic data 110 before using it for further processing. Further, the data processing module 215 may perform cleansing and deduplication of the real-time traffic data 110 to eliminate one or more redundant, duplicate or inconsistencies in the real-time traffic data 110.

In some instances, some parts of the real-time traffic data 110 may be missed while it is being transmitted to the traffic management system 103, due to reasons such as inconsistent network connectivity. Thus, data processing operations performed by the data processing module 215 may help in identifying the missing data and determining the missing data by computing mean and/or median values of parts of the real-time traffic data 110 which is already obtained by the traffic management system 103. In an implementation, the data processing module 215 may store the processed real-time traffic data 110 in the form of data frames using one or more graphical and/or statistical computing programming languages such as Python™ and R™ programming languages.

In an embodiment, the route identification module 217 may be responsible for identifying a random primary route between the source and destination location of the target vehicle 101. The primary route may be a default route recommended to the user based on the historical travel pattern of the user. Further, the route identification module 217 may be responsible for identifying the one or more alternative routes for the primary route, upon detecting the traffic congestion on the primary route. The one or more alternative routes may be identified between a current location of the target vehicle 101 and the destination location of the target vehicle 101. In an embodiment, the route identification module 217 may update the one or more alternative routes at the one or more intermediate nodes in real-time based on intensity of traffic congestion on the one or more alternative routes that are already recommended to the user.

The traffic congestion determination module 219 may be responsible for detecting traffic congestion on the primary route and/or the one or more alternative routes based on the real-time traffic data 110 received from the target vehicle 101. In an embodiment, the traffic congestion module may assign a traffic congestion weightage 211 to each of the one or more alternative routes based on the one or more congestion parameters 212 and the historical data associated with the target vehicle 101. Further, the intensity of traffic congestion may be determined based on the traffic congestion weightage 211 assigned to each of the one or more alternative routes. In an embodiment, the intensity of the traffic congestion may be directly proportional the traffic congestion weightage 211 assigned to each of the one or more alternative routes.

In an embodiment, the optimal route recommendation module 221 may be responsible for determining the optimal route 113 among the one or more alternative routes. The optimal route 113 may be determined based on the traffic congestion weightage 211 assigned to each of the one or more alternative routes. As an example, one of the one or more alternative routes having least traffic congestion weightage 211 may be determined as the optimal route 113 to the target vehicle 101. In an embodiment, the optimal recommendation module may be responsible for recommending the optimal route 113 to the user of the target vehicle 101 through a notification unit 115 configured in the target vehicle 101 and/or the computing device 107$_2$ associated with the target vehicle 101. For example, the optimal route 113 may be displayed on the display unit associated with the GPS 107$_1$ unit integrated in the target vehicle 101.

In an embodiment, the traffic management system 103 may generate one or more traffic congestion reports, in the form of graphical representations, to indicate status of traffic congestion on the one or more routes over a period. Further, one or more predictive congestion reports may be generated based on the historical data, to indicate possibility of traffic congestion on a specific route. Each of these reports generated by the traffic management system 103 may be displayed on the display interface in the target vehicle 101 and/or the computing device 107$_2$ associated with the target vehicle 101, using which the user of the target vehicle 101 can make decisions on a best route to commute.

Figure 3A:
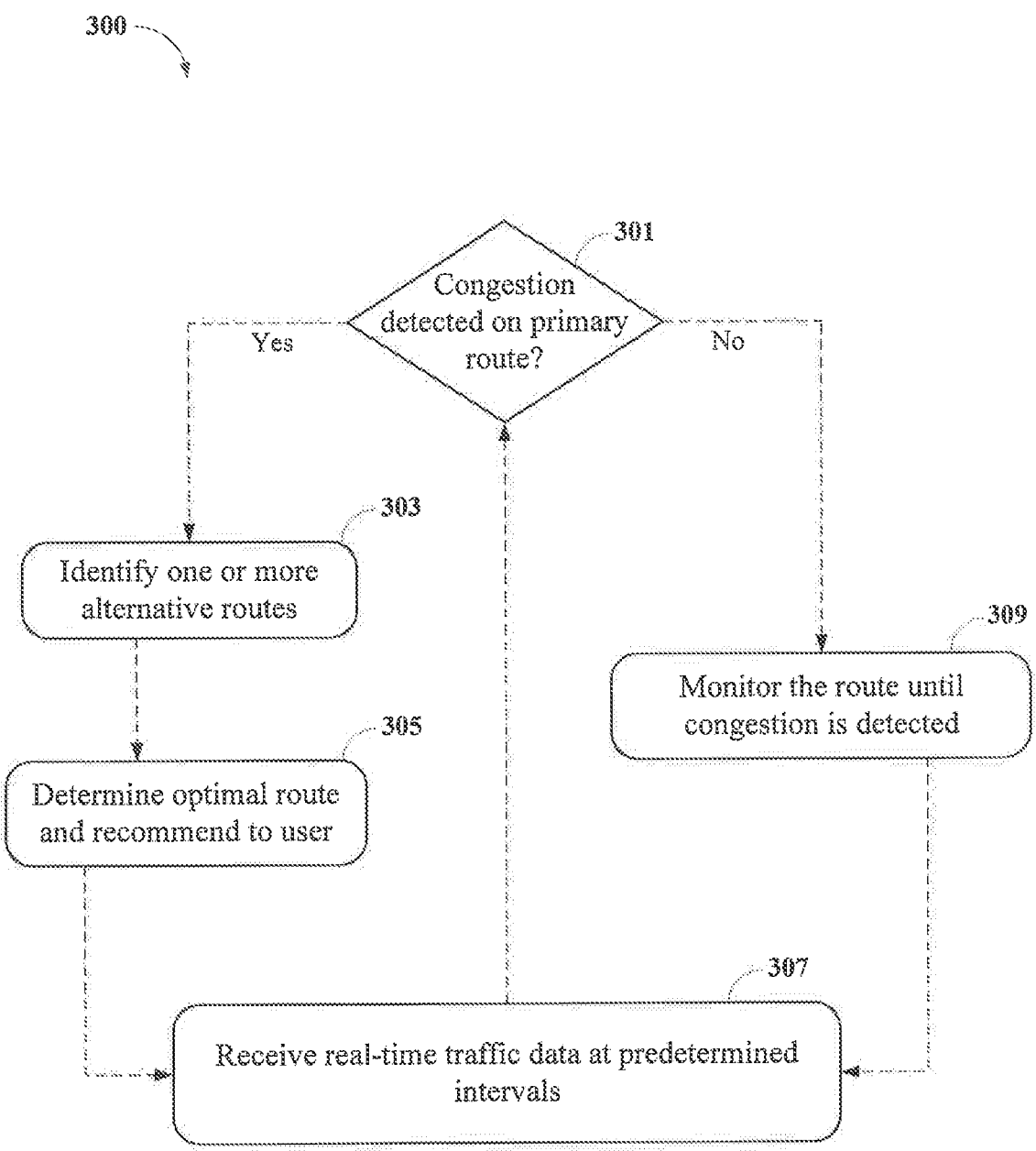
FIG. 3A shows a flowchart illustrating real-time monitoring of a route for detecting traffic congestion of vehicles in the route in accordance with some embodiments of the present disclosure.

FIG. 3A shows a flowchart 300 illustrating a method of monitoring the real-time traffic on the primary route for detecting the traffic congestion on the primary route.

At block 301, the traffic management system 103 may verify whether there has been traffic congestion on the primary route taken by the target vehicle 101. The traffic congestion on the primary route may be detected based on the real-time traffic data 110 associated with the primary route. At block 303, the traffic management system 103 may identify one or more alternative routes to the primary route when the traffic congestion is detected on the primary route. The one or more alternative routes may be identified based on the location information obtained from the target vehicle 101 and the historical traffic data associated with the target vehicle 101. Further, traffic congestion weightages 211 may be assigned to each of the one or more alternative routes based on one or more congestion parameters 212.

Upon identifying the one or more alternative routes, at block 305, the traffic management system 103 may determine an optimal route 113 among the one or more alternative routes. The optimal route 113 may be determined by comparing the traffic congestion weightages 211 of each of the one or more alternative routes and identifying the alternative route having least traffic congestion weightage 211. Further, the optimal route 113 is recommended to the user through a notification unit 115 associated with a GPS 107$_1$ and/or a computing device 107$_2$ associated with the target vehicle 101. Upon recommending the optimal route 113, at block 307, the traffic management system 103 may continuously receive the real-time traffic data 110 related to the recommended optimal route 113 to determine if there has been traffic congestion on the recommended optimal route 113. If there is no congestion on the recommended optimal route 113, then, as shown in block 309, the traffic management system 103 may continue to monitor the real-time traffic data 110, until a traffic congestion is detected on the recommended optimal route 113.

In an embodiment, if the traffic congestion is detected on the recommended optimal route 113, then the traffic management system 103 may once again identify the one or more alternative routes (as shown in block 303), to divert the target vehicle 101 on to a less congested, optimal route 113. In an embodiment, the traffic management system 103 may repeat the above process each time the traffic congestion is detected on a route being traversed by the target vehicle 101, and until the target vehicle 101 reached the destination location.

Figure 3B:
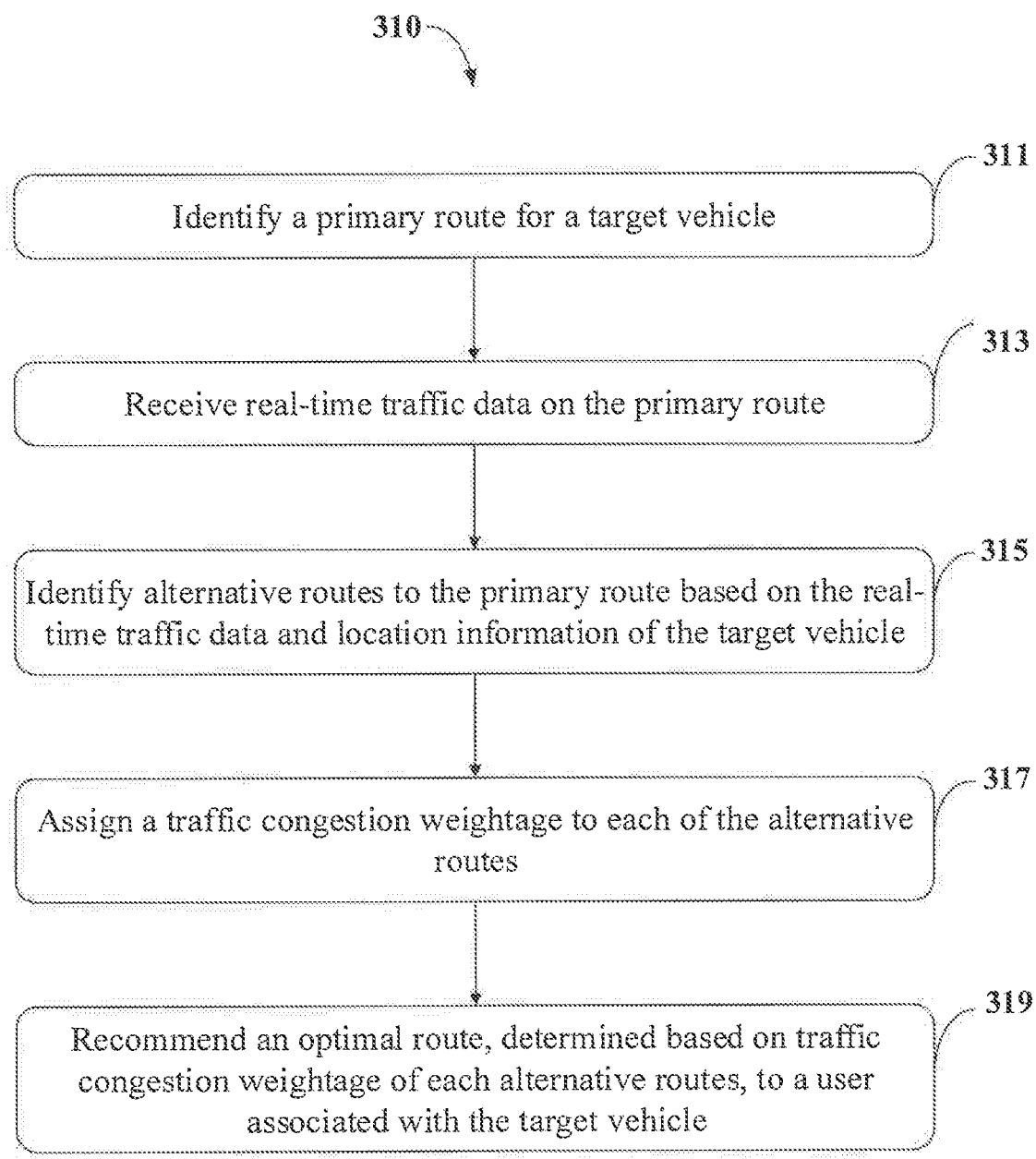
FIG. 3B shows a flowchart illustrating a method of preventing traffic congestion of vehicles in accordance with some embodiments of the present disclosure.

FIG. 3B shows a flowchart illustrating a method of preventing traffic congestion of vehicles in accordance with some embodiments of the present disclosure.

As illustrated in FIG. 3B, the method 310 includes one or more blocks illustrating a method of preventing traffic congestion of vehicles using a traffic management system 103, for example the traffic management system 103 of FIGS. 1A-1C. The method 310 may be described in the general context of computer executable instructions. Generally, computer executable instructions can include routines, programs, objects, components, data structures, procedures, modules, and functions, which perform specific functions or implement specific abstract data types.

The order in which the method 310 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 311, the method 310 includes identifying, by the traffic management system 103, a primary route for a target vehicle 101 based on source and destination information received from at least one of a Global Positioning System (GPS) 107$_1$ integrated in the target vehicle 101 and a computing device 107$_2$ associated with the target vehicle 101. As an example, the computing device 107$_2$ may be a smartphone, which is interfaced with the target vehicle 101 and capable of transmitting location information of the target vehicle 101 to the traffic management system 103. Alternatively, the source and destination information may be determined by analyzing historical data associated with the target vehicle 101.

At block 313, the method 310 includes receiving, by the traffic management system 103, real-time traffic data 110 on the primary route from at least one of a computing unit 107$_3$, and one or more sensors 109$_2$ in each of one or more vehicles 101$_2$ on the primary route. As an example, the real-time traffic data 110 may include, without limiting to, number of moving vehicles on the primary route, number of stagnant vehicles on the primary route, and total distance to be covered by the vehicle to reach the destination.

At block 315, the method 310 includes identifying, by the traffic management system 103, one or more alternative routes to the primary route based on the real-time traffic data 110 and location information of the target vehicle 101. The location information of the target vehicle 101 may be received from at least one of the GPS 107$_1$ and the computing device 107$_2$ associated with the target vehicle 101. In an embodiment, the one or more alternative routes may be identified only upon detecting congestion on the primary route.

At block 317, the method 310 includes assigning, by the traffic management system 103, a traffic congestion weightage 211 to each of the one or more alternative routes based on one or more congestion parameters 212 and historical data associated with the target vehicle 101. As an example, the one or more congestion parameters 212 may include, without limiting to, at least one of total distance corresponding to each of the one or more alternative routes, number of moving vehicles on each of the one or more alternative routes, a predetermined placement factor to be assigned to each of the moving vehicles on each of the one or more alternative routes, and number of stagnant vehicles on each of the one or more alternative routes.

In an embodiment, each of the one or more alternative routes may include one or more intermediate nodes between the source and destination locations. Further, the total distance corresponding to each of the one or more alternative routes may be determined as sum of distance between each of one or more successive intermediate nodes comprised in corresponding each of the one or more alternative routes.

At block 319, the method 310 includes recommending, by the traffic management system 103, the optimal route 113 to the user associated with the target vehicle 101 for preventing the traffic congestion. In an embodiment, the optimal route may be determined from the one or more alternative routes, based on the traffic congestion weightage 211 assigned to each of the one or more alternative routes. Further, one of the one or more alternative routes having least traffic congestion weightage 211 among the traffic congestion weightage 211 assigned to each of the one or more alternative routes may be determined as the optimal route 113 for the target vehicle 101.

In an embodiment, the optimal route 113 may be recommended to the user through at least one of a notification unit 115 configured in the target vehicle 101 and the computing device $107_2$. As an example, the notification unit 115 configured in the target vehicle 101 may include, without limitation, a display interface, or a speaker, which are used to notify the optimal route 113 to the user.

Figure 4A:
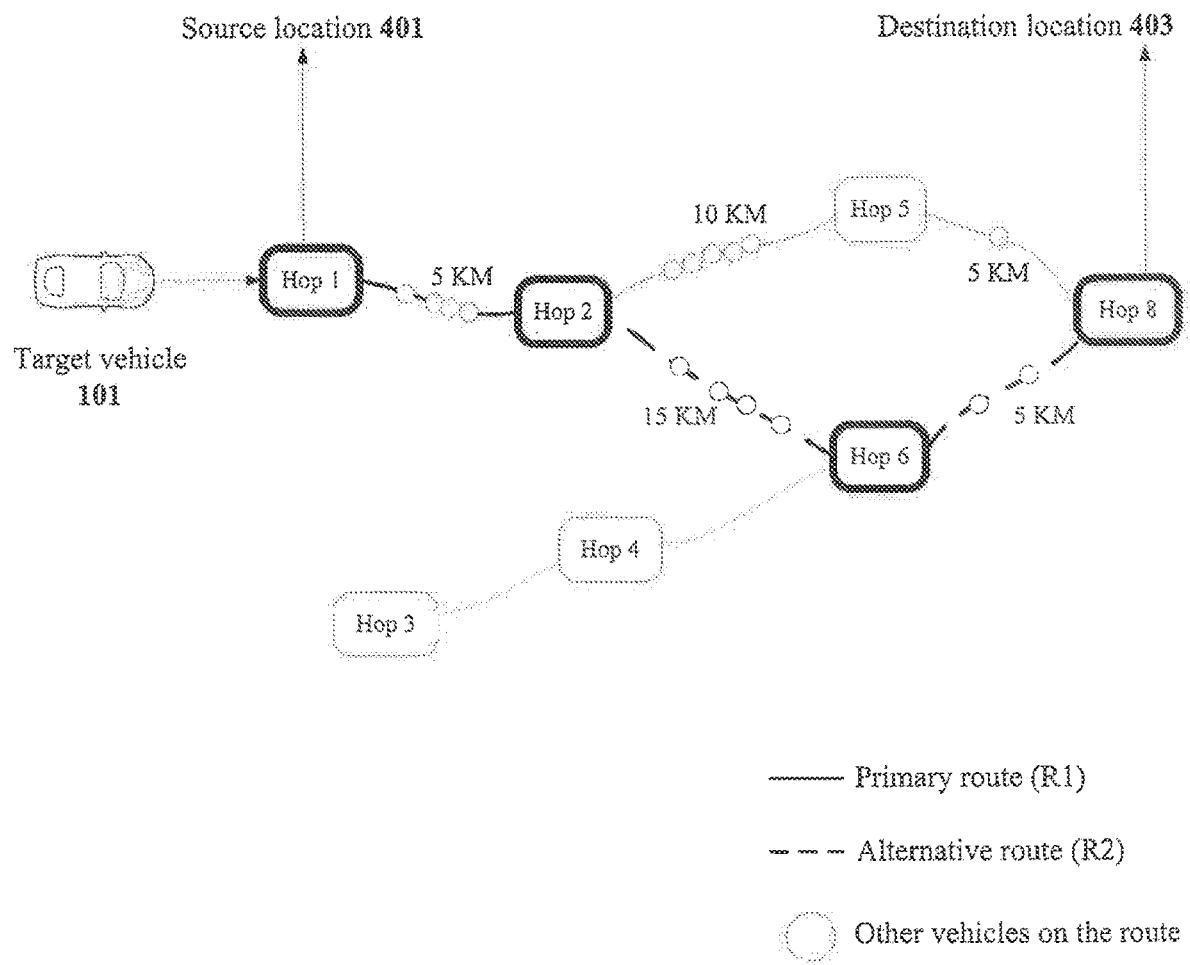
FIGS. 4A and 4B illustrate exemplary embodiments in accordance with some embodiments of the present disclosure.
Figure 4B:
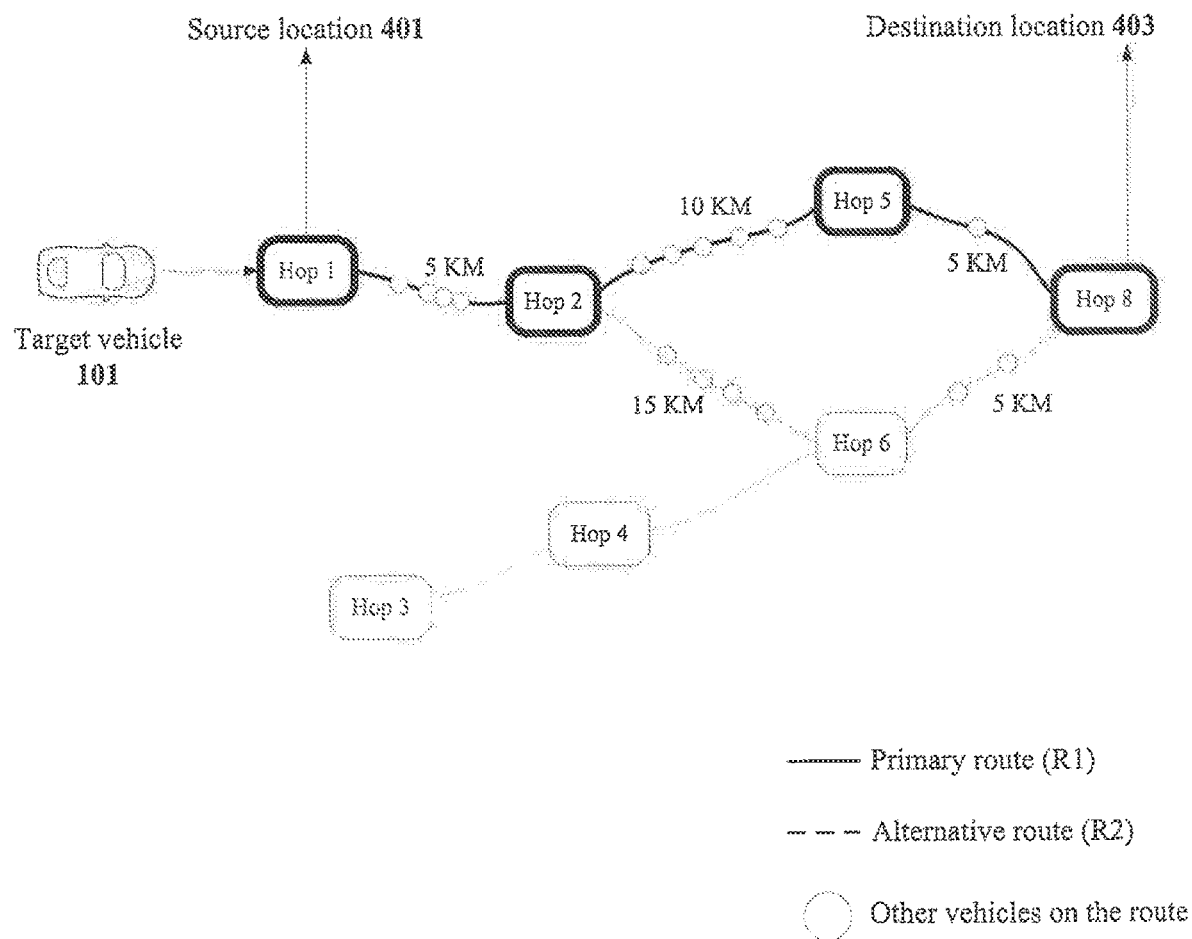

Exemplary Embodiments:

FIGS. 4A and 4B show exemplary embodiments for illustrating the method of preventing traffic congestion of vehicles, by recommending an alternative optimal route 113 to the target vehicle 101.

In an embodiment, consider a traffic scenario, which includes the target vehicle 101, starting its journey from a source location 401 to reach a destination location 403. In the present scenario, there may be two routes (R1 and R2) available for reaching the destination location 403 from the source location 401. As an example, each of the two routes 'R1' and 'R2' may be represented as below:

R1: Hop 1→Hop 2→Hop 5→Hop 8
R2: Hop 1→Hop 2→Hop 6→Hop 8

Further, one or more intermediate nodes, such as traffic junctions or rood intersections available on the route between the source location 401 and the destination location 403 may be represented by Hop1, Hop 2, . . . Hop 8.

For example, when the target vehicle 101 is starting its journey at the source location 401, the route R1 may be suggested as a primary route for the target vehicle 101 to reach the destination location 403. Here, the primary route may be suggested as a default option for the target vehicle 101 based on the historical travel pattern of the target vehicle 101.

Now, the traffic management system 103 may retrieve the real-time traffic data 110 from the target vehicle 101 which is moving on the primary route to determine intensity of the traffic on the primary route (R1). Suppose, if the traffic congestion is detected on the primary route, then, the traffic management system 103 may identify one or more alternative routes for the primary route that can be used by the target vehicle 101 to reach the destination location 403. In the present scenario, there is one alternative route, route R2, available for the target vehicle 101 to reach the destination location 403. In an embodiment, to determine the optimal route 113 among the two available routes—R1 and R2, the traffic management system 103 may assign traffic congestion weightage 211 to both the routes R1 and R2, based on one or more congestion parameters 212.

The one or more congestion parameters 212 may include, total distance of route R1 and R2, number of moving vehicles on R1 and R2, a predetermined placement factor to be assigned to each moving vehicle, and number of stagnant vehicles on R1 and R2. In the present scenario, as shown in FIG. 4A and FIG. 4B, there are 10 other vehicles available on each of the two routes R1 and R2, out of which, few are moving and few are stagnant. For example, each moving vehicle may be associated with the predetermined placement factor of 10.

In an embodiment, the traffic management system 103 may continuously monitor the route being traversed by the target vehicle 101 by analyzing the real-time traffic data 110 received from the target vehicle 101. Accordingly, each time the target vehicle 101 reaches one of the intermediate nodes, the traffic management system 103 may identify one or more alternative routes that are available between the intermediate node and the destination location 403, to determine possibility of recommending an optimal route 113 from the intermediate node. Now, assuming that, the target has moved to the intermediate node 'Hop 2', and there is traffic congestion at 'Hop 2', the traffic management system 103 may identify one or more potential alternative routes that connect to the destination location 403 from Hop 2. Further, each of the one or more alternative routes may be assigned with traffic congestion weightages 211, and an optimal route 113, among the one or more alternative routes may be determined as one of the alternative route having least traffic congestion weightage 211. The method of assigning the traffic congestion weightage 211 is explained using the below scenarios:

Scenario 1:

Suppose, there are 6 stagnant vehicles and 4 moving vehicles on route R1. The total distance of route R1 may be determined by adding distance between each successive intermediate node available on the route R1.

$$\begin{aligned}\text{i.e. Total distance of route } R1 =\ &\text{Distance (Hop 1} \rightarrow \text{Hop 2)} +\\ &\text{Distance (Hop 2} \rightarrow \text{Hop 5)} +\\ &\text{Distance (Hop 5} \rightarrow \text{Hop 8)}\\ =\ &5\text{ KM} + 10\text{ KM} + 5\text{ KM}\\ =\ &20\text{ KM}\end{aligned}$$

Similarly, the total placement factor on the route R1 may be computed as a product of the total number of moving vehicles on route R1 and the predetermined placement factor for each moving vehicle.

i.e. Placement factor for route $R1$ = Number of moving vehicles on route $R1 * 10$

= $4 * 10$

= 40 units

Further, the congestion weightage across the route R1 may be computed using the equation (1), as illustrated below:

Traffic congestion weightage for route $R1$ = (Total distance of '$R1$' +

Total placement factor *

No. of stagnant vehicles on $R1$)

= $(20 + 40 * 6)$

= 260 units.

Similarly, suppose, there are 8 moving vehicles and only 2 stagnant vehicles on route R2. The total distance of route R2 may be determined by adding distance between each successive intermediate node available on the route R2.

i.e. Total distance of route $R2$ = Distance (Hop 1 → Hop 2) +

Distance (Hop 2 → Hop 6) +

Distance (Hop 6 → Hop 8)

= 5 KM + 15 KM + 5 KM

= 25 KM

Similarly, the total placement factor on the route R2 may be computed as a product of the total number of moving vehicles on route R2 and the predetermined placement factor for each moving vehicle.

i.e. Placement factor for route $R2$ = Number of moving vehicles on route $R2 * 10$ = $8 * 10 = 80$ units Further, the congestion weightage across the route R2 may be computed using the equation (1), as illustrated below:

Traffic congestion weightage for route $R2$ = (Total distance of $R2$ +

Total placement factor *

No. of stagnant vehicles on $R2$)

= $(25 + 80 * 2)$

= 185 units.

Thereafter, the traffic management system 103 may compare the traffic congestion weightage 211 assigned to each of the alternative routes—R1 and R2, to determine the optimal route 113 among the routes R1 and R2. In the given scenario, since the traffic congestion weightage 211 of route R2 is lesser than the traffic congestion weightage 211 of the route R1, the route R2 may be considered as the optimal route 113 and recommended to the target vehicle 101.

Scenario 2:

As shown in FIG. 4B, consider a scenario wherein there are 10 moving vehicles and no stagnant vehicles on both routes—R1 and R2. Here, the optimal route 113 among the two routes, R1 and R2, may be determined by assigning the traffic congestion weightages 211 to both the routes using the equation (1), as illustrated below:

Traffic congestion weightage for route $R1$ = (Total distance of $R1$ +

Total placement factor *

No. of stagnant vehicles on $R1$)

= $(20 + 100 * 0)$

= 20 units.

Traffic congestion weightage for route $R2$ = (Total distance of $R2$ +

Total placement factor *

No. of stagnant vehicles on $R2$)

= $(25 + 100 * 0)$

= 25 units.

Since the traffic congestion weightage 211 of route R1 is lesser than the traffic congestion weightage 211 of the route R2, the route R1 may be considered as the optimal route 113 and recommended to the target vehicle 101. In other words, when there are no stagnant vehicles on the routes, the route having minimum distance may be recommended as the optimal route 113 for the target vehicle 101.

Computer System

Figure 5:
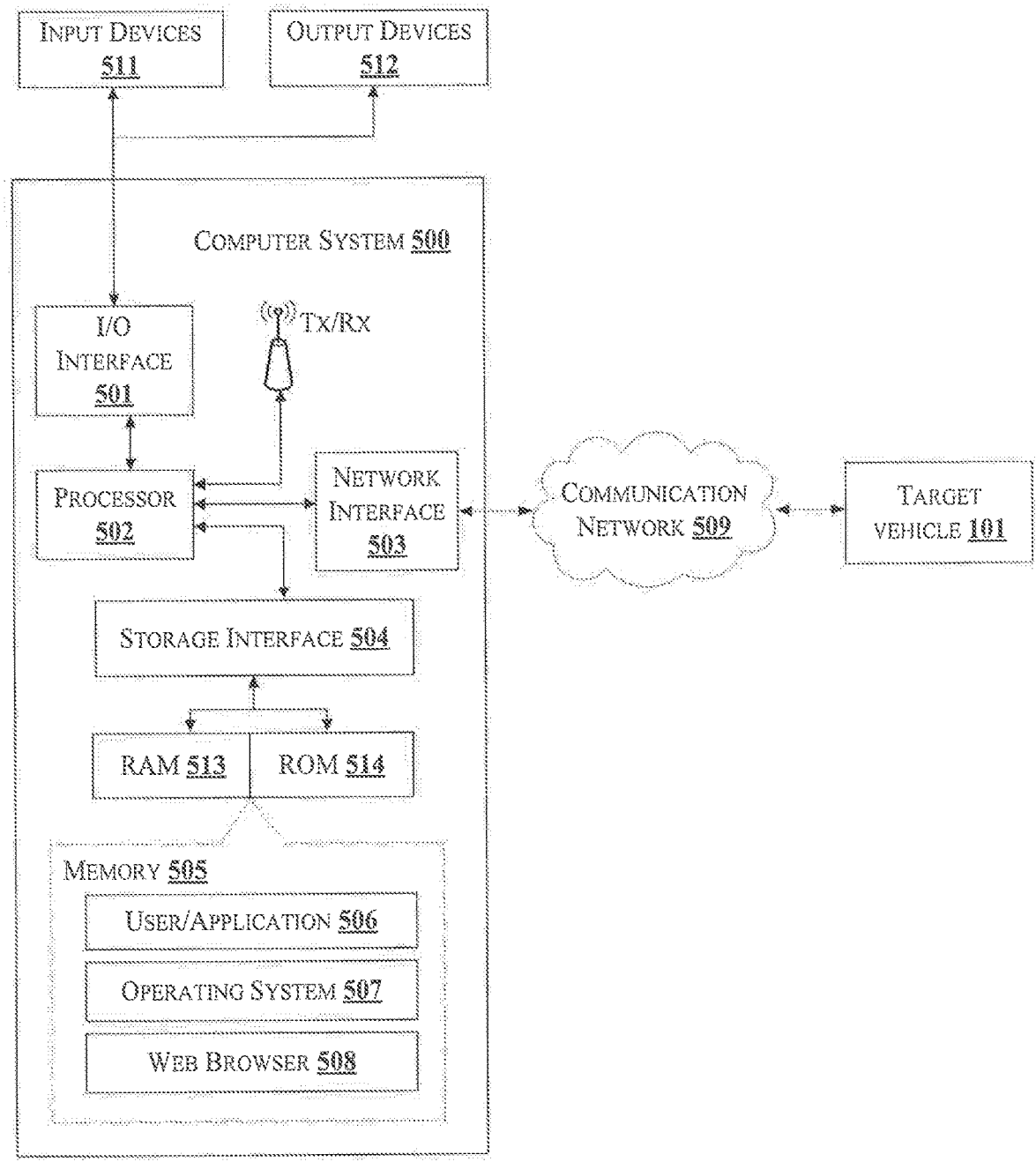
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be traffic management system 103, which is used for preventing traffic congestion of vehicles. The computer system 500 may include a central processing unit ("CPU" or "processor") 502. The processor 502 may comprise at least one data processor for executing program components for executing user- or system-generated business processes. A user may include a person, a person driving the target vehicle 101, a person driving any other vehicle on the route or a person traveling in the target vehicle 101. The processor 502 may include specialized processing units such as integrated system (bus) controllers, memory management control units, floating point units, graphics processing units, digital signal processing units, etc.

The processor 502 may be disposed in communication with one or more input/output (I/O) devices (511 and 512) via I/O interface 501. The I/O interface 501 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 501, the computer system 500 may communicate with one or more I/O devices (511 and 512). In some implementations, the processor 502 may be disposed in communication with a communication network 509 via a network interface 503. The network interface 503 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 503 and the communication network 509, the computer system 500 may connect to the target vehicle 101 for receiving real-time traffic data 110 related to the target vehicle 101, from one or more sensors 109 and/or the computing device $107_2$ interfaced in the target vehicle 101.

The communication network 509 can be implemented as one of the several types of networks, such as intranet or any such wireless network interfaces. The communication network 509 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc.

In some embodiments, the processor 502 may be disposed in communication with a memory 505 e.g., RAM 513, and ROM 514, etc. as shown in FIG. 5, via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user/application 506, an operating system 507, a web browser 508, and the like. In some embodiments, computer system 500 may store user/application data 506, such as the data, variables, records, etc. as described in this invention. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, UNIX, Unix-like system distributions (e.g., Berkeley Software Distribution (BSD), FreeBSD, Net BSD, Open BSD, etc.), Linux distributions (e.g., Red Hat, Ubuntu, K-Ubuntu, etc.), International Business Machines (IBM) OS/2, Microsoft Windows (XP, Vista/7/8, etc.), Apple iOS, Google Android, Blackberry Operating System (OS), or the like. A user interface may facilitate display, execution, interaction, manipulation, or operation of program components through textual or graphical facilities. For example, user interfaces may provide computer interaction interface elements on a display system operatively connected to the computer system 500, such as cursors, icons, check boxes, menus, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the present disclosure discloses a method of preventing traffic congestion of vehicles in a route by identifying and recommending less congested alternative routes to a user.

In an embodiment, the method of the present disclosure helps in diverting the traffic from a congested route to a less congested alternative route by recommending the users to traverse the less congested alternative route.

In an embodiment, the method of present disclosure helps in building an intelligent, real-time traffic management system that enables each vehicle to continuously communicate their current location and other real-time traffic data. Further, the intelligent system analyzes information obtained from the vehicles to recommend routes that are less congested.

In an embodiment, the method of present disclosure helps in drastically reducing Carbon footprint across densely populated cities by dynamically distributing the flow of traffic through various alternative routes in the cities.

In an embodiment, the method of present disclosure may also help the users in reducing wastage and/or additional fuel consumption during traffic congestion, and the users are freed from traffic stress and pollution.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise. A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
|---|---|
| 100A, 100B | Exemplary environments |
| 101 | Target vehicle |
| $101_2$ | One or more vehicles |
| 103 | Traffic management system |
| 105 | Communication network |
| $107_1$ | Global Positioning System (GPS) |
| $107_2$ | Computing device in the target vehicle |
| $107_3$ | Computing device in one or more vehicles |
| 109 | Sensors in target vehicle |
| $109_2$ | Sensors in one or more vehicles |
| 110 | Real-time traffic data |
| 111 | Traffic data repository |
| 113 | Optimal route |
| 115 | Notification unit |
| 201 | I/O interface |
| 203 | Processor |
| 205 | Memory |
| 207 | Data |
| 209 | Modules |
| 211 | Traffic congestion weightage |
| 212 | Congestion parameters |
| 213 | Other data |
| 215 | Data processing module |
| 217 | Route identification module |
| 219 | Traffic congestion determination module |
| 221 | Optimal route recommendation module |
| 223 | Other modules |
| 401 | Source location |
| 403 | Destination location |
| 500 | Exemplary computer system |
| 501 | I/O Interface of the exemplary computer system |
| 502 | Processor of the exemplary computer system |
| 503 | Network interface |
| 504 | Storage interface |
| 505 | Memory |
| 506 | User/Application |
| 507 | Operating system |
| 508 | Web browser |
| 509 | Communication network |
| 511 | Input devices |
| 512 | Output devices |
| 513 | RAM |
| 514 | ROM |

What is claimed is:

1. A method of preventing traffic congestion of vehicles, the method comprising:
identifying, by a traffic management system, a primary route for a target vehicle based on source and destination information received from at least one of a Global Positioning System, associated with the target vehicle, and a computing device associated with the target vehicle, or by analyzing historical data associated with the target vehicle;
receiving, by the traffic management system, real-time traffic data on the primary route from at least one of a computing unit and one or more sensors in each of one or more vehicles on the primary route, wherein the computing unit is associated with a unique identification number, and wherein the unique identification number of the computing unit is pre-registered with the traffic management system, and wherein a dedicated communication link is established between the traffic management system and the pre-registered computing unit to facilitate the reception of the real-time traffic data by the traffic management system;
identifying, by the traffic management system, one or more alternative routes to the primary route based on the real-time traffic data and location information of the target vehicle received from at least one of the GPS and the computing device;
assigning, by the traffic management system, a traffic congestion weightage to each of the one or more alternative routes based on one or more congestion parameters and historical data associated with the target vehicle; and
recommending, by the traffic management system, an optimal route to a user associated with the target vehicle for preventing the traffic congestion, the optimal route being determined from the one or more alternative routes, based on the traffic congestion weightage assigned to each of the one or more alternative routes.

2. The method as claimed in claim 1, wherein the one or more alternative routes are identified upon detecting congestion on the primary route.

3. The method as claimed in claim 1, wherein one of the one or more alternative routes having least traffic congestion weightage, among the traffic congestion weightage assigned to each of the one or more alternative routes, is determined as the optimal route for the target vehicle.

4. The method as claimed in claim 1, wherein each of the one or more alternative routes comprises one or more intermediate nodes.

5. The method as claimed in claim 1, wherein the one or more congestion parameters comprises at least one of total distance corresponding to each of the one or more alternative routes, number of moving vehicles on each of the one or more alternative routes, a predetermined placement factor to be assigned to each of the moving vehicles on each of the one or more alternative routes, and number of stagnant vehicles on each of the one or more alternative routes.

6. The method as claimed in claim 5, wherein the total distance corresponding to each of the one or more alternative routes is determined as sum of distance between each of one or more successive intermediate nodes comprised in corresponding each of the one or more alternative routes.

7. The method as claimed in claim 1, wherein the optimal route is recommended to the user through at least one of a notification unit configured in the target vehicle and the computing device.

8. A traffic management system for preventing traffic congestion of vehicles, the traffic management system comprises:
- a processor; and
- a memory, communicatively coupled to the processor, wherein the memory stores processor-executable instructions, which on execution cause the processor to:
  - identify a primary route for a target vehicle based on source and destination information received from at least one of a Global Positioning System, associated with the target vehicle, and a computing device associated with the target vehicle, or by analyzing historical data associated with the target vehicle;
  - receive real-time traffic data of the primary route from at least one of a computing unit and one or more sensors in each of one or more vehicles on the primary route, wherein the computing unit is associated with a unique identification number, and wherein the unique identification number of the computing unit is pre-registered with the traffic management system, and wherein a dedicated communication link is established between the traffic management system and the pre-registered computing unit to facilitate the reception of the real-time traffic data by the traffic management system;
  - identify one or more alternative routes to the primary route based on the real-time traffic data and location information of the target vehicle received from at least one of the GPS and the computing device;
  - assign a traffic congestion weightage to each of the one or more alternative routes based on one or more congestion parameters and historical data associated with the target vehicle; and
  - recommend an optimal route to a user associated with the target vehicle for preventing the traffic congestion, the optimal route being determined from the one or more alternative routes, based on the traffic congestion weightage assigned to each of the one or more alternative routes.

9. The traffic management system as claimed in claim 8, wherein the instructions cause the processor to identify one or more alternative routes upon detecting congestion on the primary route.

10. The traffic management system as claimed in claim 8, wherein the instructions cause the processor to determine one of the one or more alternative routes having least traffic congestion weightage, among the traffic congestion weightage assigned to each of the one or more alternative routes, as the optimal route for the target vehicle.

11. The traffic management system as claimed in claim 8, wherein each of the one or more alternative routes comprises one or more intermediate nodes.

12. The traffic management system as claimed in claim 8, wherein the one or more congestion parameters comprises at least one of total distance corresponding to each of the one or more alternative routes, number of moving vehicles on each of the one or more alternative routes, a predetermined placement factor to be assigned to each of the moving vehicles on each of the one or more alternative routes, and number of stagnant vehicles on each of the one or more alternative routes.

13. The traffic management system as claimed in claim 12, wherein the instructions cause the processor to determine the total distance corresponding to each of the one or more alternative routes as sum of distance between each of one or more successive intermediate nodes comprised in corresponding each of the one or more alternative routes.

14. The traffic management system as claimed in claim 8, wherein the instructions cause the processor to recommend the optimal route to the user through at least one of a notification unit configured in the target vehicle and the computing device.

15. A non-transitory computer readable medium including instructions stored thereon that when processed by at least one processor cause a traffic management system to perform operations comprising:
- identifying, by a traffic management system, a primary route for a target vehicle based on source and destination information received from at least one of a Global Positioning System, associated with the target vehicle, and a computing device associated with the target vehicle, or by analyzing historical data associated with the target vehicle;
- receiving, by the traffic management system, real-time traffic data on the primary route from at least one of a computing unit and one or more sensors in each of one or more vehicles on the primary route, wherein the computing unit is associated with a unique identification number, and wherein the unique identification number of the computing unit is pre-registered with the traffic management system, and wherein a dedicated communication link is established between the traffic management system and the pre-registered computing unit to facilitate the reception of the real-time traffic data by the traffic management system;
- identifying, by the traffic management system, one or more alternative routes to the primary route based on the real-time traffic data and location information of the target vehicle received from at least one of the GPS and the computing device;
- assigning, by the traffic management system, a traffic congestion weightage to each of the one or more alternative routes based on one or more congestion parameters and historical data associated with the target vehicle; and
- recommending, by the traffic management system, an optimal route to a user associated with the target vehicle for preventing the traffic congestion, the optimal route being determined from the one or more alternative routes, based on the traffic congestion weightage assigned to each of the one or more alternative routes.

16. The method of claim 1, further comprising elimination of redundancy in the received real-time traffic data, by the traffic management system, based on performing cleansing and de-duplication operations on the received real-time traffic data.

17. The method of claim 4, wherein the one or more alternative routes are identified at each of the one or more intermediate nodes, based on arrival of the target vehicle at each intermediate node from the one or more intermediate nodes.

* * * * *